United States Patent [19]

Walker et al.

[11] Patent Number: 4,596,662

[45] Date of Patent: Jun. 24, 1986

[54] COMPOSITIONS FOR USE IN DRILLING, COMPLETION AND WORKOVER FLUIDS

[75] Inventors: Terris F. Walker; Jacob E. Strassner, both of Houston, Tex.

[73] Assignee: Dresser Industries, Inc., Dallas, Tex.

[21] Appl. No.: 620,214

[22] Filed: Jun. 13, 1984

[51] Int. Cl.$^4$ .......................... C09K 7/02; E21B 43/00
[52] U.S. Cl. ............................. 252/8.5 C; 252/8.55 R; 252/8.55 D; 252/354
[58] Field of Search ......... 252/8.5 C, 8.55 R, 8.55 D, 252/354

[56] References Cited

U.S. PATENT DOCUMENTS

| | | | |
|---|---|---|---|
| 2,978,409 | 4/1961 | Greenwald et al. | 252/8.55 |
| 3,301,328 | 1/1967 | Campion. | |
| 3,601,194 | 8/1971 | Gallas | 166/283 |
| 3,858,656 | 1/1975 | Flournoy et al. | 252/8.55 X |
| 4,059,154 | 11/1977 | Braden et al. | 166/274 |
| 4,122,020 | 10/1978 | Valcho et al. | 252/8.55 |
| 4,247,405 | 1/1981 | Wier | 252/8.5 X |
| 4,252,657 | 2/1981 | Barriol et al. | 252/8.55 |
| 4,415,463 | 11/1983 | Mosier et al. | |

*Primary Examiner*—Herbert B. Guynn
*Attorney, Agent, or Firm*—Richard M. Byron; J. Hughes Powell

[57] ABSTRACT

This invention provides an additive composition for use for example in drilling, completion and workover fluids that minimizes production formation damage by increasing well clean up efficiency and aids in recovering oil held in place by dynamic capillary forces between oil, water and injected fluids, driving down the water saturation of the formation resulting in an increase in permeability to oil and resulting production. These additives, found to be especially useful in 38% calcium chloride workover and completion fluids, are also effective in 25 and 10% sodium chloride workover and completion fluids, as well as other brines, including bromides. The additives of this invention, when added to fluid workover and completion fluids, in addition to reducing interfacial tension in production formations to minimize water blocks resulting from use of workover and completion fluids, and compatability with brines, also promote water wetting, demulsification and are thermally stable over a useful range. These novel additives contain three essential ingredients, a diester monosulfosuccinate, a polypropoxylated quaternary ammonium chloride, and a sodium alkylaryl polyether sulfate.

20 Claims, No Drawings

COMPOSITIONS FOR USE IN DRILLING, COMPLETION AND WORKOVER FLUIDS

BACKGROUND OF THE INVENTION

Use of fluids in drilling, completion and workover operations in oil and gas wells results in substantial loss of potentially recoverable petroleum materials. During finishing operations in the completion of a well, a variety of water containing fluids may be used, including drill in and completion fluids and the like, that often also include brine. In the course of these operations involving water containing fluids permanent damage to the production formation is caused by introduction of water into the formation that decreases and often irreparably damages the formation and reduces the amount of oil and/or gas that may be recovered from the producing formation. Increased water saturation in the producing formation that decreases the permeability to oil and gas therein can be a significant factor in this damage.

The industry has devoted much effort to off-setting the damage done to formations after completion of the well and subsequent production as in secondary recovery and well stimulation operations. Little effort, however, has gone into minimizing formation damage during drilling, workover and completion operations. It is much more desirable to attempt to minimize formation damage during finishing operations in completing a well and to reduce the presence of interstitial water in the production formations than at some later time.

It is therefore, an object of this invention to provide means to prevent or minimize formation damage and subsequent loss of potential oil and gas production because of invasion of aqueous fluids from a wellbore into production zones. It is desirable to provide an additive for such fluids to minimize formation damage from loss of drilling, workover, completion or stimulating fluids into a petroleum reservoir, to reduce interfacial tension to minimize water blocked formations. The additives should be compatible with formation fluids, promote water wetting and demulsification, have good thermal stability and be effective over a wide range of brine concentrations.

PRIOR ART

There is extensive literature relating to stimulation of production from petroleum reservoirs wherein the formations contain excessive quantities of interstitial water, i.e. water blocks, in formations in the vicinity of the production wells, that result in decreased recovery of petroleum materials from a well, generally directed to treating formation damage, not preventing it. The use of surfactants in enhancing oil permeability to water blocked formations, and in enhanced recovery operations to improve production from petroleum bearing zones and formations are described in the literature. Following are typical patents relating to this technology including use of surfactants in fluid loss control, fracturing and oil recovery operations.

U.S. Pat. No. 2,978,409 concerns a method for elimination of water blocks in petroleum oil wells, consisting of introducing into an oil well, hampered by a water block, a composition of 0.1 to 8% total of defined alkylphenoxypolyalkyleneoxy alkanols, a compound of the formula $R_3OH$ wherein $R_3$ is an alkylphenyl, alkyl or alkoxyalkyl group, and optionally, a sulfosuccinate such as dioctyl sodium sulfosuccinate in an oleaginous carrier.

U.S. Pat. No. 3,301,328 is directed to well stimulation, specifically in the use of surface active agents to stimulate production from reservoirs containing excess interstitial water in the oil bearing formations. Reference is made to many patents describing surface active agents that have been proposed for treating oil bearing formations that have encountered decreased production, and the patent states that use of these materials generally produced little beneficial effect. This patent discloses use of a combination of surface active agents to provide a method for stimulating oil production from zones partially or wholly blocked by interstitial water. The combination disclosed was 50 to 70% of an alkali metal salt of a sulfonated diester of succinic acid having $C_8$ aliphatic ester groups, such as di-n-octyl sodium sulfosuccinate, 20 to 40% of an alkali metal salt of a sulfonated diester of succinic acid having $C_6$ aliphatic ester groups, and 5 to 20% of a long chain substituted polyethoxyethanol such as isooctyl phenyl polyethoxyethanol containing 9 to 10 moles of ethylene oxide per mole of isooctyl phenol, dissolved in water or a hydrocarbon solvent.

U.S. Pat. No. 3,601,194 relates to treating subterranean formations penetrated by a well using a low loss fluid composition in the treatment of oil and gas wells. The method and composition have application to hydraulic fracturing, in well treating processes and in completion of wells drilled into oil-bearing permeable formations. In this patent, this is accomplished by temporarily plugging the permeable subterranean formation by employing a low loss fluid comprising a dispersion of an oil-soluble, water-insoluble solid wax or wax-polymer particles in an aqueous liquid, containing a surface active agent selected from the group consisting of nonionic ethers, polyethers and thioethers having an HLB factor of 8.5 to 19.5; nonionic surface active esters having an HLB factor between 10 and 14.5; nonionic surface amines having an HLB factor of about 4 to 10; nonionic surface active amides having an HLB factor of 7 to 10.5; anionic surface active sulfonates having an AFL factor of 7 to 12.5; anionic surface active organosulfates having an AFL factor of 5.5 to 7.5; anionic surface active organophosphates having an AFL factor of 12 to 39; and cationic surfactants having a CFL of 19 to 38. The essential wax-polymer particles are selected so as to dissolve or be soluble in oil, and they function as plugging agents, effective in reducing permeability of the formation for a limited time only. Obviously, compounding these compositions is extremely critical to prevent permanent damage to production formations.

U.S. Pat. No. 4,059,154 pertains to enhanced recovery of petroleum from a subterranean hydrocarbon reservoir utilizing as a recovery medium, emulsified mixtures of hydrocarbons, aqueous fluids and surfactants. The particular problem involved in this invention was providing dispersions not adversely affected by hard water. The surfactant systems proposed contained a water soluble salt of an alkyl or arylalkyl sulfonate such as sodium dodecyl benzene sulfonate, plus a water soluble salt of an alkyl or aralkyl polyethoxylated sulfate such as sodium dodecyl polyethoxy sulfate, plus a fatty acid diethanolamide, a polyethoxalated aliphatic alcohol or a polyethoxylated alkyl phenol, the combination of which resulted in thickened fluids for use in recovering petroleum from reservoirs. Secondary recovery by water injection and the like will have been applied to the reservoir before the application of these thickened fluids as a slug in accordance with this invention.

U.S. Pat. No. 4,122,020 pertains to oil recovery methods using surfactants useful in removing oil from reservoirs that have been subject to straight water flooding or polymer flooding operations. Without use of surfactants or other tertiary recovery processes, this oil is said to be essentially nonrecoverable from these reservoirs. By means of the invention described, a process is prepared for moving oil from an oil bearing formation which comprises injecting into the formation an aqueous fluid containing a particular group of succinate surface active agents, optionally in conjunction with a sulfonate as sodium polybutene sulfonate.

U.S. Pat. No. 4,252,657 relates to a concentrate for preparation of oil and water microemulsions intended for assisted petroleum recovery by carrying out displacement of crude petroleum retained in the pores of a formation by injection of microemulsifiers to solubilize the petroleum in the microemulsion. The concentrate comprises a mixture of at least three surfactants, a salt of an alkylsulphuric acid, a salt of an alkylaryl sulfonic acid and a salt of a sulphosuccinic acid or sulphosuccinamic acid. This mixture is then added to crude petroleum and water with a defined ion salinity.

SUMMARY OF THE INVENTION

This invention provides an additive composition for use for example in drilling, completion and workover fluids that minimizes production formation damage by increasing well clean-up efficiency and aids in recovering oil held in place by dynamic capillary forces between oil, water and injected fluids, driving down the water saturation of the formation resulting in an increase in permeability to oil and increased production. These compositions are capable of functioning over a broad range of brine types and concentrations and have been found to be especially useful for example in 38% calcium chloride completion and workover fluids, in 25% and 10% sodium chloride completion and workover fluids, as well as other brines, including bromides. The composition of this invention, when added to completion and workover fluids, in addition to reducing interfacial tension in production formations to minimize water blocks resulting from use of workover and completion fluids, and having compatability with brines, also promote water wetting, demulsification and are thermally stable over a useful range. The novel composition comprises three essential ingredients, a diester monosulfosuccinate, and a sodium alkylaryl polyether sulfate.

DETAILED DESCRIPTION

The novel compositions of this invention find use in oil field processes involving drilling, logging, workovers, completion, perforating, stimulation, killing and the like. The surfactant combinations reduce interfacial and surface tension to allow filtrates to be more effectively removed. Since the novel compositions do not damage the formation, contrary to experience with most surfactants, increased production is observed after well clean-up. These compositions minimize formation damage when used in conjunction with field water, sea water, sodium and potassium chloride solutions, 10 to 25% solutions for example, with calcium chloride solutions containing as high as 38% calcium chloride, bromide brines including calcium bromide, and other high brine solutions.

Additive compositions contain, on an active basis, about 30 to 70 weight percent of the diester monosulfosuccinate, about 30 to 55 weight percent of polypropoxylated quaternary ammonium chloride and about 0.1 to 4 weight percent of sodium alkylphenyl polyether sulfate. Normally the three essential ingredients are mixed together with water to form a solution. While any amount of water that will solubilize the mixture may be employed, an excess is not needed and is expensive to ship and it has been found that about 20 to 40 percent water provides useful additive solutions. The solutions find use in oil field process fluids, especially brines, per se for spotting techniques.

The diester monosulfosuccinate, preferably used in amounts from about 40 to 60 weight percent, is a glycol diester of sodium monosulfosuccinate and has the formula

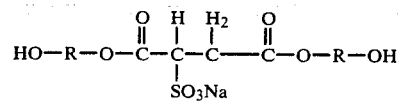

wherein R, derived from aliphatic glycols, is a divalent alkylene radical containing 2 to 8 carbon atoms, preferably 3 to 5, as from propylene glycol, butylene glycol and pentamethylene glycol.

The second constituent of the composition, a polypropoxylated quaternary ammonium salt preferably used in amounts from 30 to 55 weight percent, is the reaction product of a hydroxytertiaryamine such as hydroxyethyldiethylmethyl amine and propylene oxide, in amounts, for example, of about 3 to 6 moles of propylene oxide per mole of amine, and has the general formula

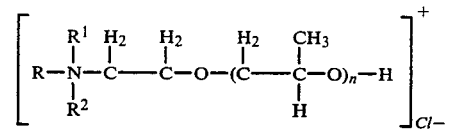

wherein R, $R_1$ and $R_2$ are alkyl radicals containing 1 to 6 carbon atoms, preferably 1 to 2, as methyl and ethyl, and n is a number from 2 to 20, preferably 3 to 6.

The third essential ingredient of the compositions, preferably used in amount from 1 to 3 weight percent, is a sodium alkylaryl polyether sulfate, derived for example from an alkyl phenol and ethylene oxide alkoxylate in amounts of about 1 mole of alkyl phenol and about 6 moles of ethylene oxide to form the alkylphenyl. The general structure is

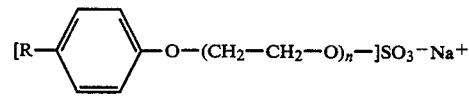

wherein R is an alkyl radical containing 6 to 12 carbon atoms, preferably 8 to 10, and n is from 4 to 8. A typical material is sodium nonylphenoxyethoxy sulfate wherein R is nonyl and n is 6.

The most useful form of these three ingredients is in water solutions with a minimum amount of water, which may vary from about 20 to 50 weight percent of the mixture.

The concentration of the surfactant combinations in brines in field use should be at least about 0.1 weight percent. Excellent results are obtained at about 0.15 to about 2.5 weight percent, more preferably from about 0.2 to 0.5 weight percent. On a cost basis, because of the large volumes required in oil field processes, more effective and less expensive concentrations are preferred of about 0.2 to 0.5 weight percent active constituents in the three component composition.

In the following Examples, the surfactant composition or combination used was prepared with the following surfactants: 1 weight part of the diester monosulfosuccinate having the formula

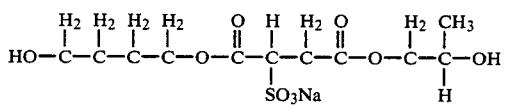

This material had a solids content of 70% and contained 62 weight percent of the active material of the formula. 0.1 weight part of sodium nonylphenyl polyethersulfonate, supplied commercially at a concentration of the active material of 29 weight percent and 0.5 weight part of a tetrapropoxylated hydroxyethyldiethylmethyl ammonium chloride. This material was 100% active. These three essential materials were dissolved in 1 weight part of water to form the novel surfactant composition. This combination contained 44.2 weight percent actives and this is added to the brines of the Examples in amount to provide 0.5 weight percent of the total composition in the brines (0.22 weight percent actives). Use of this invention results in low brine/oil interfacial tensions, effective water wetting of formation rocks, enhancement of formation permeability, and compatibility with clear brines. Products of this invention are stable over a useful range of temperatures and cause at most, minimum damage to formations.

A slightly modified visual wettability test, API RP42, Second Ed., January 1977 API RECOMMENDED PRACTICES FOR LABORATORY TESTING OF SURFACE ACTIVE AGENTS FOR WELL STIMULATION, was used to demonstrate the effect of the surfactant composition in 38% CaCl$_2$ solution on preferential oil or water wettable sand. 40–60 mesh San Saba sand was wetted by the aqueous surfactant brine solution for about 15 minutes and then lifted with a spatula into the oil phase. Dispersion and/or clumping of the sand was observed as it is allowed to fall from the spatula. Clumping of the sand in oil indicates preferential water wettability. Clumping of the oil wetted sand in the water layer further indicated preferential oil wettability. With diesel or light crude oil, preferential oil-water wettability tests show that these compositions are water wetting to sand.

The interfacial tension (IFT) between 38% calcium chloride solution containing the compositions of the invention and various oils was determined in accordance with API RP42. The concentrated surfactant blend was diluted to 0.5 weight percent in 38% CaCl$_2$ brine, an equal volume of diesel oil was added and the mixture was equilibrated by shaking one hour in a mechanical shaking apparatus. The IFT was measured by one of two methods: Dynamic IFT is measured in the spinning drop tensiometer and static IFT is measured in the sessile drop apparatus. The interfacial tensions of 0.5 weight percent surfactant concentrate in 38% CaCl$_2$ in various oils were determined to be:

| API | OIL | IFT |
|---|---|---|
| 35° | #2 Diesel Oil | 0.07 dyne cm$^2$ |
| 41° | Canadian Crude | 0.20 dyne/cm$^2$ |
| 39° | Gulf Coast Crude | 0.43 dyne/cm$^2$ |
| 26° | Gulf Coast Crude | 1.50 dyne/cm$^2$ |

The IFT of 38% CaCl$_2$ and #2 diesel oil was 23.1 dyn/cm$^2$ using a Dynamic Spinning Drop Tensiometer.

Polypropoxylated quaternary ammonium chloride only in brine had an interfacial tension with diesel oil of 17 dyn/cm$^2$, much too high for many formations, particularly those with tight porosity, compared to an IFT of 0.07 dyn/cm$^2$ obtained with the three component compositions. The IFT of the diester monosulfosuccinate alone was 6.0 dyn/cm$^2$, higher than desirable, and this material alone also showed weak water-wetting characteristics, and was on the borderline of having oil-wetting characteristics which is undesirable.

In the following Examples, demonstrating the practice and advantages of the invention, the effectiveness of the surfactant compositions was determined in a Core Permeability Test Apparatus. Reference is made to API RP 27, Third Edition, September, 1952, Reissued August, 1956, RECOMMENDED PRACTICE for DETERMINING PERMEABILITY of POROUS MEDIA, American Petroleum Institute. The permeameter is designed to study flow through permeable media. Berea sandstones having 50–100 md permeability simulate reservoir formations. These Examples use both high and low pressure flow rate conditions involving oil and brines. The purpose of the high pressure flow rate test is to determine if use of the surfactant combination is damaging to permeability to oil, since high oil flow rates reduce water saturation to low values where oil permeability is near a maximum; further reduction in water saturation due to surfactants would have little effect on permeability to oil. Adverse reactions could however cause damage. In the low pressure-low oil flow rate test, however, water saturation is not reduced to a saturation providing maximum permeability to oil and further reduction in water saturation can result in improved permeability to oil and adverse reactions also can cause damaged permeability to oil.

EXAMPLE 1

High Pressure Flood—CaCl$_2$ Solution

This test involved a 50 psi differential fluid pressure against a Berea sandstone core. 5% NaCl was used to simulate native downhole formation brine. #2 diesel oil was used to simulate downhole crude oil. The Berea sandstone cores measured 1½ inches in diameter and 2 inches in length. A pore volume represents the amount of fluid a core holds. One Berea sandstone core of 1½ by 2 inch dimensions held 10 mls. of fluids. The initial oil permeability (k) was 61.4 millidarcies. The core was alternately flooded with 5% NaCl and diesel oil as shown in the Table. The arrows ↓ or ↑ represent direction of flow through the core. The surfactant was added to 11 lb/gal CaCl$_2$ and injected. The final stage was to flood the core with 5% NaCl and then diesel oil to see if the surfactant was easily washed out of the core. The return k was 58.0 millidarcies. The core was then flooded with formation brine and the residual permeability after washing was 71.0 millidarcies (md). This resulting k value is actually 16% higher than the initial oil value. This type of overall permeability improvement is usually small, is unpredictable and may represent test variations. See Table 1.

TABLE 1

| Fluid | Permeability | No. of Pore Volumes |
|---|---|---|
| 1. 5% NaCl ↓ | 44.2 md | 10 |
| 2. Diesel ↓ | 47.3 md | 10 |
| 3. 5% NaCl ↑ | 4.2 md | 5 |
| 4. Diesel ↓ | 61.4 md | 10 |
| 5. Surfactant in 11 lb/gal CaCl₂ ↑ | 4.8 md | 5 |
| 6. Diesel ↓ | 58.0 md | 22 |
| 7. 5% NaCl ↑ | 7.1 md | 5 |
| 8. Diesel ↓ | 71.0 md | 14 |

When this Example was repeated using a composition of 1 part of the diester monosulfosuccinate, 0.1 part of the sodium alkylaryl polyether sulfate, and without the polypropoxylated quarternary ammonium chloride (O), an unstable emulsion was created after step 7, the NaCl wash, and the composition requires the polypropoxylated quarternary ammonium chloride to break or prevent emulsions formed by high pressure shearing through the core. When this Example is run with CaCl₂ solution alone and no surfactant, the permanent core damage was about 10%. The values were calculated as follows:

$$\frac{\text{initial oil } k \ (61.4) - \text{final oil } k \ (58.0)}{\text{initial oil } k \ (61.4)} \times 100 = 6\% \text{ damage}$$

residual $k$ after 5% NaCl flood $= \frac{61.4 - 71.0}{61.43} \times 100 =$

16% improvement over initial $k$

EXAMPLE 2

This high pressure flood was run utilizing the surfactant blend in 10% KCl brine. The initial permeability of this core to oil was 41.2 md. The surfactant blend was added in amount of 0.5 dry weight percent to the 10% KCl and flooded through the core. The resulting final permeability was 42.9 md. No damage occurred and an increased amount of formation brine was produced back from the core. The core was then flooded with formation brine and the residual permeability reduction was negligible. See Table 2.

TABLE 2

High Pressure Flood at 50 psi
10ml = 1 pore volume

| Fluid | Permeability | No. of Pore Volumes |
|---|---|---|
| 1. 5% NaCl ↓ | 40.5 md | 10 |
| 2. Diesel ↓ | 32.2 md | 10 |
| 3. 5% NaCl ↑ | 3.6 md | 5 |
| 4. Diesel ↓ | 41.2 md | 10 |
| 5. Surfactant in 10% KCl ↑ | 6.7 md | 5 |
| 6. Diesel ↓ | 42.9 md | 10 |
| 7. 5% NaCl ↑ | 6.3 md | 5 |
| 8. Diesel ↓ | 39.6 md | 10 |

Initial k to oil = 41.2 md.
Final k to oil after surfactant = 42.90 md.

% k damage = $\frac{41.2 - 42.9}{41.2} \times 100 = 4.2\%$ stimulation

Residual permeability reduction after 5% NaCl flood =
$\frac{41.2 - 39.6}{41.2} = 4\%$

EXAMPLE 3

High Pressure Flood—25% NaCl

The surfactant combination was tested in 25% NaCl at a 50 psi differential pressure added to the clear brine at 0.5 weight percent concentration. The initial permeability of this core to oil was 37.8 md. The fluid permeability after the surfactant flood was 28.4 md., about 25% damage. The residual k after flooding with 5% NaCl was 35.2 md. See Table 3.

TABLE 3

High Pressure Flood at 50 psi - 25% NaCl

| Fluid | Permeability | No. of Pore Volumes |
|---|---|---|
| 1. 5% NaCl ↓ | 42.3 md | 10 |
| 2. Diesel ↓ | 28.8 md | 10 |
| 3. 5% NaCl ↑ | 3.3 md | 5 |
| 4. Diesel ↓ | 37.8 md | 10 |
| 5. Surfactant in 25% KCl ↑ | 4.4 md | 5 |
| 6. Diesel ↓ | 28.4 md | 10 |
| 7. 5% NaCl ↑ | 6.8 md | 5 |
| 8. Diesel ↓ | 35.2 md | 10 |

Initial k to oil = 37.8 md.
Final k to oil = 28.5 md.

% k damage = $\frac{37.8 - 28.5}{37.8} = 25\%$ damage

Residual permeability reduction after 5% NaCl flood =
$\frac{37.8 - 35.2}{37.8} = 7\%$ reduction in permeability Tests were then run at low differential pressures where permeability to oil is less than the maximum permeability achieved under high differential pressure due to a higher water saturation at the lower pressures. This low pressure flood test was designed to show the effects of surfactants under reduced reservoir pressure or other reduced differential pressure conditions. The Berea sandstone core is initially saturated with brine and maximum oil permeability is initially established by flowing oil at elevated pressure to produce a higher flow rate of 1 ml/min. Then a simulated damage condition with high water saturated is established by flowing brine at a low pressure differential and low flow rate (0.1 ml/min.). Damaged oil permeability is measured at the low flow rate. Original permeability to oil is reestablished by flowing oil at the higher differential pressure and flow rate of 1 ml/min. Water damage is again established at low flow rates, this time with a surfactant brine solution. A second damaged permeability to oil is measured at low flow rate and compared with the initial damaged permeability. Lower permeability cores generally show more damage in low presure core floods. Examples 4, 5, and 6 demonstrate the effectiveness of this critical surfactant combination in removing water blocks at low differential pressure.

EXAMPLE 4

The slow rate of injection was controlled by low pressures and flow rate. The surfactant composition has the ability to better wet the formation by increasing its absorption time. The initial permeability to oil of this core containing 5% NaCl brine was 50.7 md., 11.4 ppg CaCl₂ was injected and the oil permeability was reduced to 15.2 md. at 0.1 cc/min flow rate. 0.5 weight percent of the surfactant composition was added to 11.4 ppg CaCl₂ and injected through the core. The final return permeability was 33.8 md., a 122% increase over the core's damaged condition. See data in Tables 4 and 5.

EXAMPLE 5

This low pressure test involved the addition of the surfactant composition in 10% KCl. The initial permeability to oil of this core containing 5% NaCl brine was 50.1 md. 10% KCl was injected slowly through the core at 0.1 cc/min. The resulting permeability to oil after 10% KCl was 19.3 md. 0.5 weight percent of the surfactant was then added to 10% KCl and pumped through the core at 0.1 cc/min. The final permeability of the core to diesel at 0.1 cc/min. flow rate was 36.8 md., about a 91% improvement over the damaged state of the core. The initial permeability of the core to oil at 1 cc/min. compared to the final permeability of oil showed a 32% increase after the addition of the surfactant composition. See data in Tables 4 and 5. This type of increase was also apparent in the high pressure flood test in Example 2.

EXAMPLE 6

The surfactant combination was tested in 25% NaCl at reduced pressures and flow rate. The initial permeability to oil of this core containing 5% NaCl brine was 46.6 md. 25% NaCl was injected slowly through the core at 0.1 cc/min. The resulting permeability to oil at 0.1 cc/min. was 20.3 md. The surfactant combination was then added to 25% NaCl and injected at a flow rate of 0.1 cc/min. and the final permeability was 35.4 md. at 0.1 cc/min. flow rate. The addition of the surfactant combination showed a 74% improvement in k over the damaged condition. The initial k of 46.6 at 1 cc/min. compared to the final k value after surfactant at 1 cc/min. 49.0 md. showed 5% improvement after adding the surfactant combination to 25% NaCl. The residual k to to oil after brine washing the core was 45.8 md. or a 98% return after brine. See Tables 4 and 5 for data.

TABLE 4

Low Pressure Flood Effect of Surfactant on Oil Permeability

| Example | Test Brine | Flow Rate | Oil Permeability - md 5% NaCl | Test Brine | SA Test Brine |
|---|---|---|---|---|---|
| 4 (a) | 11.4 lb/gal $CaCl_2$ | 0.1 ml/min | 50.7 | 15.2 | 33.8 |
| (b) | 11.4 lb/gal $CaCl_2$ | 1.0 ml/min | 50.7 | 41.5 | 38.4 |
| (c) | 11.4 lb/gal $CaCl_2$ | 1.0 ml/min | 50.7 | 49.7 | 48.1 |
| 5 (a) | 10% KCl | 0.1 ml/min | 50.1 | 19.3 | 36.8 |
| (b) | 10% KCL | 1.0 ml/min | 50.1 | 55.7 | 66.1 |
| (c) | 10% KCl | 1.0 ml/min | 50.1 | 52.3 | 38.1 |
| 6 (a) | 25% NaCl | 0.1 ml/min | 46.6 | 20.3 | 35.4 |
| (b) | 25% NaCl | 1.0 ml/min | 46.6 | 42.0 | 49.1 |
| (c) | 25% NaCl | 1.0 ml/min | 46.6 | 39.3 | 45.8 |

(a) Permeability to oil at low flow rate of 0.1 ml/min
(b) Permeability to oil at higher flow rate of 1.0 ml/min
(c) Permeability to oil at higher flow rate of 1.0 ml/min after test brine was replaced with 5% NaCl (simulated connate water)

TABLE 5

Low Pressure Flood Effect of Surfactant on Oil Permeability Damage at Low Flow Rates

| Ex. | Test Brine | % Oil Permeability Damage* Test Brine | SA Test Brine | % Oil Permeability** Improvement with SA |
|---|---|---|---|---|
| 4 | 11.4 lb/gal $CaCl_2$ | 70% | 33% | 122% |
| 5 | 10% KCl | 61% | 27% | 91% |
| 6 | 25% NaCl | 57% | 24% | 74% |

*% Oil Permeability Damage =
$\frac{\text{Original Permeability} - \text{Damaged Permeability}}{\text{Original Permeability}} \times 100$

**% Oil Permeability Improvement with SA =
$\frac{\text{SA Permeability} - \text{Test Salt Permeability}}{\text{Test Salt Permeability}} \times 100$

EXAMPLE 7

Thermal stability of surfactant solutions containing 0.5 weight percent of the surfactant composition in 38% $CaCl_2$ were poured into open glass jars and placed in a stainless steel bomb. Additional surfactant solution was poured into the bomb to prevent evaporation of fluid from inside the glass container. The bomb was then sealed and heated statically at temperatures from 75° F. to 350° F. After 24 hours the bombs were placed in a water filled sink, cooled and opened. Physical properties of the heat aged solutions were measured at room temperature. The solutions were observed for physical signs of deterioration such as precipitation. The surfactant solution remained clear and water white up to 250° F.

We claim:

1. A composition comprising about 30 to 70 weight percent of a glycol diester of sodium monosulfosuccinate having the formula

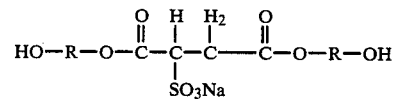

wherein R is a divalent alkylene radical containing 2 to 8 carbon atoms, 30 to 50 weight percent of a polypropoxylated quaternary ammonium chloride having the general formula

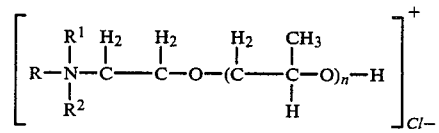

wherein R, $R^1$ and $R^2$ are alkyl radicals containing 1 to 6 carbon atoms and n is a number from 2 to 20, and about 0.1 to 4 weight percent of a sodium alkylphenyl polyether sulfate having the formula

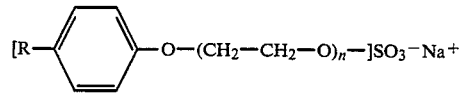

wherein R is an alkyl radical containing 6 to 12 carbon atoms and n is 4 to 8.

2. A composition of claim 1 wherein in the glycol diester of sodium monosulfosuccinate R is 3 to 5.

3. A composition of claim 1 wherein in the polypropoxylated quaternary ammonium chloride R, $R^1$ and $R^2$ contain 1 to 2 carbon atoms and n is 3 to 6.

4. A composition of claim 1 wherein in the sodium alkylphenyl polyether sulfate R contains 8 to 10 carbon atoms and n is 1 to 6.

5. A composition of claim 1 wherein the glycol diester of sodium monosulfosuccinate has the formula

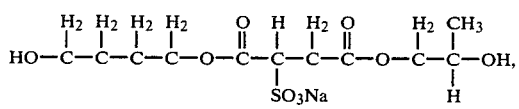

in the polypropoxylated quaternary ammonium chloride at least two of R, $R^1$ and $R^2$ are ethyl and the other is methyl, and n is 6, and in the sodium alkylphenyl polyether sulfate R is nonyl and n is 6.

6. A composition of claim 1 in water.

7. A composition of claim 6 wherein the composition contains about 40 to 60 weight percent of the glycol diester of sodium monosulfosuccinate, about 35 to 50 weight percent of polypropoxylated quaternary ammonium chloride and about 1 to 3 weight percent of sodium alkylphenyl polyether sulfonate.

8. A composition of claim 7 containing about 20 to 40 weight percent water.

9. A composition of claim 5 containing about 50 to 55 weight percent of the glycol diester of sodium monosulfosuccinate, about 1 to 3 weight percent of the polypropoxylated quaternary ammonium chloride and about 40 to 50 weight percent sodium alkylphenyl polyether sulfonate dissolved in water in a solution containing less than 50 weight percent water.

10. A composition of claim 9 wherein in the glycol diester of sodium monosulfosuccinate R is 3 to 5, in the polypropoxylated quaternary ammonium chloride R, $R^1$ and $R^2$ contain 1 to 2 carbon atoms and n is 3 to 6, and the sodium alkyl phenyl polyether sulfate is an alkylphenoxyethoxy sulfate wherein R contains 8 to 10 carbon atoms and n is 1 to 6.

11. In well drilling, completion and workover processes in oil bearing formations wherein brine solutions are introduced into the well in contact with said formations, the improvement comprising adding to said brine from about 0.1 to about 5 weight percent of a surfactant composition comprising about 30 to 70 weight percent of a glycol diester of sodium monosulfosuccinate having the formula

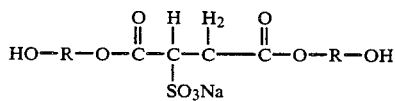

wherein R is a divalent alkylene radical containing 2 to 8 carbon atoms, 30 to 50 weight percent of a polypropoxylated quaternary ammonium chloride having the general formula

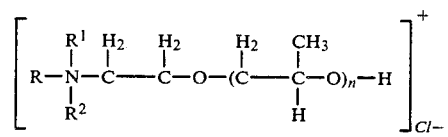

wherein R, $R^1$ and $R^2$ are alkyl radicals containing 1 to 6 carbon atoms and n is a number from 2 to 20, and about 0.1 to 4 weight percent of a sodium alkylphenyl polyether sulfate having the formula

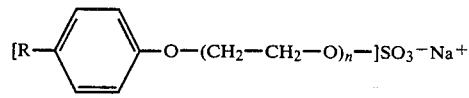

wherein R is an alkyl radical containing 6 to 12 carbon atoms and n is 4 to 8, wherein formation damage is minimized.

12. A process of claim 11 wherein in the glycol diester of sodium monosulfosuccinate R is 3 to 5.

13. A process of claim 11 wherein in the polypropoxylated quaternary ammonium chloride R, $R^1$ and $R^2$ contain 1 to 2 carbon atoms and n is 3 to 6.

14. A process of claim 11 wherein in the sodium alkylphenyl polyether sulfate R contains 8 to 10 carbon atoms and n is 1 to 6.

15. A process of claim 11 wherein the glycol diester of sodium monosulfosuccinate has the formula

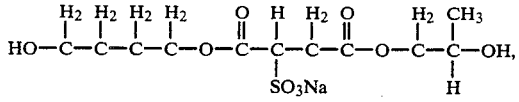

in the polypropoxylated quaternary ammonium chloride at least two of R, $R^1$ and $R^2$ are ethyl and the other is methyl, and n is 6, and in the sodium alkylphenyl polyether sulfate R is nonyl and n is 6.

16. A process of claim 11 in water.

17. A process of claim 16 wherein the composition contains about 40 to 60 weight percent of the glycol diester of sodium monosulfosuccinate, about 35 to 50 weight percent of polypropoxylated quaternary ammonium chloride and about 1 to 3 weight percent of sodium alkylphenyl polyether sulfonate.

18. A process of claim 17 containing about 20 to 40 weight percent water.

19. A process of claim 15 containing about 50 to 55 weight percent of the glycol diester of sodium monosulfosuccinate, about 1 to 3 weight percent of the polypropoxylated quaternary ammonium chloride and about 40 to 50 weight percent sodium alkylphenyl polyether sulfonate dissolved in water in a solution containing less than 50 weight percent water.

20. A process of claim 19 wherein in the glycol diester of sodium monosulfosuccinate R is 3 to 5, in the polypropoxylated quaternary ammonium chloride R, $R^1$ and $R^2$ contain 1 to 2 carbon atoms and n is 3 6, and the sodium alkyl phenyl polyether sulfate is an alkylphenoxyethoxy sulfate wherein R contains 8 to 10 carbon atoms and n is 1 to 6.

* * * * *

UNITED STATES PATENT AND TRADEMARK OFFICE
CERTIFICATE OF CORRECTION

PATENT NO. : 4,596,662

DATED : June 24, 1986

INVENTOR(S) : Terris F. Walker and Jacob E. Strassner

It is certified that error appears in the above-identified patent and that said Letters Patent are hereby corrected as shown below:

In Column 1, line 51, "i.e." should read --i.e.,--.

In Column 3, line 2, "slug" should read --sludge--.

In Column 3, line 52, between "monosulfosuccinate," and "and" insert --a polypropoxylated quaternary ammonium chloride,--.

In Column 8, line 19, "25% KCl" should read --25% NaCl--.

UNITED STATES PATENT AND TRADEMARK OFFICE
CERTIFICATE OF CORRECTION

PATENT NO. : 4,596,662
DATED : June 24, 1986
INVENTOR(S) : Terris F. Walker and Jacob E. Strassner It is certified that error appears in the above-identified patent and that said Letters Patent are hereby corrected as shown below:

In Column 8, line 41, "saturated" should read --saturation--.

In Column 9, line 37, "to to" should read --to--.

In Column 9, line 50, "KCL" should read --KCl--.

In Column 10, line 24, "F." should read --F--.

In Column 12, line 61, "3 6," should read --3 to 6,--.

Signed and Sealed this

Twenty-first Day of June, 1988

Attest:

DONALD J. QUIGG

Attesting Officer     Commissioner of Patents and Trademarks